United States Patent Office 2,919,192
Patented Dec. 29, 1959

2,919,192

PROTEIN FOOD PRODUCTS AND THEIR PREPARATION

Andre Hirsch, Brian Montague Gibbs, and Bernard David Hemmings, Bedford, England, assignors to Lever Brothers Company, New York, N.Y., a corporation of Maine No Drawing. Application January 27, 1958
Serial No. 711,165

Claims priority, application Great Britain
January 29, 1957

9 Claims. (Cl. 99—14)

This invention relates to food products and to their preparation. In particular, it relates to cheese-like products made from vegetable protein, especially groundnut protein.

The present invention provides a process for the preparation of a cheese-like product from groundnut protein, in which fat is added to an aqueous suspension or solution of groundnut protein, the suspension or solution containing fat is homogenised and the suspension or solution is heated either before or after the addition of fat or homogenization, a curd is precipitated from the suspension or solution by the action of acid, the curd is cut and the cut curd is drained, pressed and ripened to a cheese-like product.

The groundnut protein must have been separated from most of the oil which is normally present in the natural product, either by expressing the oil or by solvent extraction of the oil. Preferably, groundnut meal which has been subjected to both these treatments is used as the source of protein. Most preferably, the groundnut meal should not contain more than about 1% by weight of residual oil.

It is advantageous to dissolve the groundnut protein in mild alkali to separate it from most of the vegetable material insoluble in mild alkali.

It is preferable to use an aqueous suspension or solution of groundnut protein which contains a proportion of soluble carbohydrate, preferably a mono- or disaccharide which will support lactic fermentation. Such an aqueous suspension or solution can conveniently be prepared by extracting the substantially oil-free protein containing material, for instance, groundnut meal which has been subjected to the treatments referred to above, with mild alkali such as, for example, 0.01 N sodium hydroxide solution. Thus, for instance, the extraction may conveniently be carried out by suspending a substantially oil-free groundnut meal in water and adding sufficient alkali to dissolve out the protein, whilst leaving, as a residue, insoluble carbohydrate and certain other materials contained in the meal. The alkali solution may then be separated from the residue, for instance, by centrifuging.

The concentration of protein used in the aqueous suspension or solution will generally be limited by economic considerations. As little as 1.5–2% of protein, by weight, may give rise to a suitable curd but generally about 2.5–3% will be used, although higher concentrations, for instance, about 4.5%–5% can be used if desired.

It is necessary to add fat to the solution or suspension of protein and such fat is preferably added before heating is carried out. The fat content will vary with the protein content; the greater the amount of protein, the greater the amount of fat required; approximately equal concentrations of fat and protein are usually taken. Generally, a refined, deodorized vegetable fat is used, for instance, partly hardened groundnut oil and partly hardened palm oil.

The aqueous suspension or solution containing fat is heated so that a curd, resembling the curd or clot which results from the action of rennet on milk in normal cheese-making, may subsequently be obtained from the heat-treated suspension or solution by the action of acid. Heating modifies the groundnut protein by converting it, at least partially, to a form which facilitates curd formation.

The suspension or solution is heated, preferably to at least 80° C., preferably with agitation, although heating to 90° C. or more may be carried out. The temperature to which the suspension or solution is heated is a major factor in determining the properties of the curd which is obtained, higher temperatures tending to give a firmer curd. Although the upper limit of temperature to which the suspension or solution may be heated is usually determined by its boiling point, it may be possible to raise the boiling point by the use of increased pressure.

Other factors are the pH of the suspension or solution and the hardness of water used in making up the suspension or solution.

The pH of the suspension or solution is preferably in the range 7.0–8.0, most preferably about 7.5. Use of a suspension or solution having a pH above 8 leads to increased firmness of the curd but may also lead to undesirable effects, such as brown color.

When soft water is used (by "soft water" is meant water having a hardness of not greater than 5 parts of $CaCO_3$ per 100,000 parts of water), it is generally sufficient to heat the suspension or solution to 90° C. When using hard water, on the other hand, it may be advisable to use a calcium sequestering agent, such as sodium pyrophosphate or citrate, and to heat at higher temperatures, about 95–100° C. often being required. Frequently, the suspension or solution will be held at the selected temperature for about 5 minutes, although a shorter period of heating may suffice.

The suspension or solution must be homogenized after the addition of fat, either before or after heating.

A curd is precipitated from the suspension or solution, after the heating, by the action of acid. Normally, the hot suspension or solution is cooled prior to precipitation, preferably to a temperature of not more than 40° C. In the case where a starter organism is used the suspension or solution must be cooled before inoculation with the starter organism to a temperature suitable for the growth of the organism.

Acids which can be used for precipitating the curd must be free from toxicity or other properties undesirable in a food product and include, for instance, hydrochloric acid and lactic acid.

According to a preferred method of performing the invention lactic acid is formed in situ in the heat-treated suspension or solution which has been cooled to a temperature suitable for the growth of a lactic acid producing starter organism and then inoculated with a culture of the starter organism. Suitable starter organisms are the lactic streptococci.

If groundnut protein which has been extracted from groundnut meal with mild alkali in the manner described earlier is used, sucrose will be present with the protein. In such a case, it is convenient to use a starter organism capable of fermenting sucrose, in particular, a sucrose fermenting strain of lactic streptococci.

Mono- or disaccharides, such as lactose may be added to the suspension or solution if desired and such an addition must be made if insufficient mono- or disaccharide to support growth of the starter organism used is derived from the groundnut protein extract.

Of the sucrose fermenting bacteria preferred for use according to the invention, it is frequently convenient to use nisin-producing strains, such as may be isolated from milk.

Temperatures of about 30° C. are generally suitable for the growth of the starter organisms described above. Usually, the fermentation is allowed to proceed at about 30–35° C., preferably at about 32° C.

Whilst rennet cannot be used by itself to precipitate the groundnut protein in the form of a suitable curd, it is often preferred to add rennet to modify the texture of the curd. The rennet is conveniently added at the same time as the bacterial starter culture. If desired, lactobacilli such as *Lactobacillus casei* may be incorporated in the suspension or solution to assist in subsequent ripening.

The pH will fall during the growth of the organism, due to the production of acid. When the pH has fallen sufficiently, curd formation begins. When the curd has formed to a sufficient extent it is cut, for instance, with cheese knives, or broken up by stirring, for example, with wooden rakes, after which it is allowed to settle and drain and is separated from the whey. (The watery liquid obtained on separation of the curd is referred to as whey and resembles, in appearance, whey obtained in conventional processes of making cheese from milk.) The curd so obtained may be used to make a hard cheese-like product, for instance, of the Cheddar type. In general, the more the pH is allowed to fall, the firmer the curd becomes. However, if cutting is delayed too long it may be difficult to achieve satisfactory drainage and to this end it is preferred that cutting should take place at a pH of not less than about 5.8. Usually, curd formation begins at a pH of about 6.3 and it is preferred to cut the curd at a pH of about 6.0.

A preferred step is to heat the curd, after cutting, to a temperature of not more than about 45° C., preferably about 35° C., to accelerate the separation of curd from whey. Temperatures higher than about 45° C. may favor the growth of thermophilic spoilage bacteria.

A preferred method of drainage may be carried out by placing a perforated tray or sheet on the surface of the cut curd and adding weights gradually to the tray or sheet so that the curd is compacted whilst the whey percolates through the tray or sheet and collects above it. The whey can subsequently be removed, for instance, by pumping. Some control of the rate of drainage can be obtained by variation of temperature and the applied weight. With rapid drainage it is possible to replace part of the whey by hot water, after a short time. This causes the temperature to rise, the curd to become firmer and the whey to separate faster. It is necessary to ensure, however, that nutrients essential for bacterial growth are not removed in undesirably large amounts by this process.

The curd is then pressed and ripened. Prior to ripening, the cheese may be bandaged or covered with a protective material such as wax, or a thermoplastic film. Ripening may be carried out by the method used for ripening cheese prepared in the conventional manner from milk. The cheese-like products so obtained generally resemble hard cheese of the Cheddar type.

The following example illustrates the invention:

*Example 1*

Groundnut meal, freed from oil by low-temperature solvent extraction, was stirred with dilute aqueous sodium hydroxide, 1 part meal to 9 parts 0.03% NaOH, for 30 minutes. The water used contained 40 parts per 100,000 hardness. The suspension was centrifuged to remove insoluble matter, and the separated solids washed with a further 6 parts of water and recentrifuged. The liquors from both centrifugings were combined and given a further centrifuging treatment to remove fine particles.

The liquor contained nearly 1% sucrose and about 2½% protein. 2½% w./v. of a refined, deodorized mixture of partly hardened groundnut oil and partly hardened palm oil was added, in addition to 0.1% sodium citrate, and the liquor was heated with constant stirring to 75–80° C. At this temperature the liquor was homogenized at 2000 p.s.i. and rapidly heated in a plate-type heat exchanger to 97° C. and cooled to 32° C. The liquor was then inoculated with 2½% w./v. of a skimmed-milk culture of a sucrose-fermenting nisin-producing strain of *Streptococcus lactis*, 1% of mixed strains of *Lactobacillus casei* and 0.0075% of a commercial rennet preparation.

The inoculated liquor was held at 32° C. and the lactic acid produced by the culture caused the pH to fall, the protein and fat gradually forming a curd. After about 4 hours the curd was firm enough to cut with cheese knives, the pH value then being 6.0. The curd was then heated to 35° C. over a period of 10 minutes, and the whey separated by placing a weighted perforated tray on the surface of the curd and pumping off the whey as it collected above the tray. When no further whey separated, the tray was removed and the curd broken up, salted with 2% NaCl and packed into molds. The molds were pressed at gradually increasing pressures reaching a maximum of 3.6 kg./cm.$^2$.

After 24 hours at this pressure, the curd was removed from the mold, bandaged, and transferred to a ripening store where it was allowed to ripen for 4–6 months at 16° C. and about 80% R.H. with daily turning.

The product resembled a hard cheese of the Cheddar type in texture and had a cheesy flavor.

We claim:

1. Process for preparing a cheese-like product, which comprises incorporating vegetable fat with an aqueous suspension of substantially oil-free groundnut extract containing sucrose, homogenizing the resulting suspension at 75 to 100° C., cooling to a temperature not above 35° C., inoculating the cooled suspension with a sucrose-fermenting strain of lactic streptococci, batching the suspension until a curd has formed and the pH has fallen to within the range 5.8 to 6.3, cutting the curd while the pH remains in this range, and draining, pressing and ripening the resulting product.

2. Process for preparing a cheese-like product, which comprises incorporating vegetable fat with an aqueous suspension of substantially oil-free groundnut extract containing sucrose, homogenizing the resulting suspension at 75 to 100° C., cooling to a temperature not above 35° C., inoculating the cooled suspension with a sucrose-fermenting strain of lactic streptococci and with rennet, batching the suspension until a curd has formed and the pH has fallen to within the range 5.8 to 6.3, cutting the curd while the pH remains in this range, and draining, pressing and ripening the resulting product.

3. A cheese-like product which comprises compacted homogeneous curds of conjointly precipitated substantially oil-free groundnut extract and vegetable fat, said curds containing water and products of the action of sucrose-fermenting lactic streptococci on sugar.

4. A cheese-like product which comprises compacted homogeneous curds of conjointly precipitated substantially oil-free groundnut extract and vegetable fat, said curds containing water, rennet and products of the action of sucrose-fermenting lactic streptococci on sugar.

5. A process according to claim 1 in which the pH of the dispersion prior to precipitation is in the range 7.0 to 8.0.

6. A process according to claim 1 in which the dispersion contains from 1.5 to 5% by weight of groundnut protein.

7. A process according to claim 1 in which the amount of fat added is from 1.5 to 5%, by weight, of the dispersion.

8. A process according to claim 1 in which the aqueous dispersion of groundnut protein and sucrose is obtained by extraction of substantially oil-free groundnut meal with dilute sodium hydroxide solution, the aqueous dispersion having a pH of 7.0 to 8.0.

9. A process according to claim 1 in which the sucrose fermenting strain of lactic streptococci is a nisin-producing strain.

References Cited in the file of this patent

UNITED STATES PATENTS

| | | |
|---|---|---|
| 869,371 | Kellogg | Oct. 29, 1907 |
| 1,868,422 | Luecke | July 19, 1932 |
| 2,224,720 | Butterworth et al. | Dec. 10, 1940 |
| 2,560,621 | Wrenshall | July 17, 1951 |

FOREIGN PATENTS

| | | |
|---|---|---|
| 774,444 | Great Britain | May 8, 1957 |